United States Patent [19]

Barmakian

[11] Patent Number: 4,938,169

[45] Date of Patent: Jul. 3, 1990

[54] GROOMING APPARATUS AND METHOD

[76] Inventor: Bruce B. Barmakian, 8560 Vineyard Ave., #510, Rancho Cucamonga, Calif. 91730

[21] Appl. No.: 306,060

[22] Filed: Feb. 6, 1989

[51] Int. Cl.$^5$ ............................................. A01K 13/00
[52] U.S. Cl. ....................................... 119/83; 119/15; 160/179; 160/DIG. 8
[58] Field of Search ................... 119/83, 85, 86, 88, 119/15, 158, 157, 156; 160/11, 160, 179, DIG. 8, 405

[56] References Cited

U.S. PATENT DOCUMENTS

| | | | |
|---|---|---|---|
| 2,441,058 | 5/1948 | Carwile | 119/83 |
| 2,758,646 | 8/1956 | Johnson | 119/156 |
| 2,832,406 | 4/1958 | Turenne | 160/179 |
| 2,865,329 | 12/1958 | Elliot | 119/83 |
| 2,882,964 | 4/1959 | Watkins | 160/DIG. 8 |
| 2,976,841 | 3/1961 | Scheffer | 119/83 |
| 4,022,226 | 5/1977 | Beckett et al. | 160/12 |
| 4,022,263 | 5/1977 | Beckett et al. | 160/179 |
| 4,350,198 | 9/1982 | Naegeli | 160/179 |
| 4,407,234 | 10/1983 | Kleman | 119/158 |
| 4,807,569 | 2/1989 | Leopold | 119/83 |

FOREIGN PATENT DOCUMENTS

| | | | |
|---|---|---|---|
| 461582 | 6/1928 | Fed. Rep. of Germany | 119/83 |
| 1453979 | 4/1902 | France | 160/179 |
| 2177282 | 1/1987 | United Kingdom | 119/15 |

Primary Examiner—John Weiss
Attorney, Agent, or Firm—Denton L. Anderson

[57] ABSTRACT

An animal gate and a method for using the animal gate are provided for the self-grooming of a pet animal. The animal gate has closure panels made up of contiguous triangular flaps attached in a peripheral frame with their apices convergent at a common central point. Each of the triangular flaps has numerous bristles disposed perpendicular to the plane of each flap. As the animal traverses the animal gate by pushing aside the triangular flaps, the bristles disposed within the flaps engage the animal's fur and groom the fur.

20 Claims, 3 Drawing Sheets

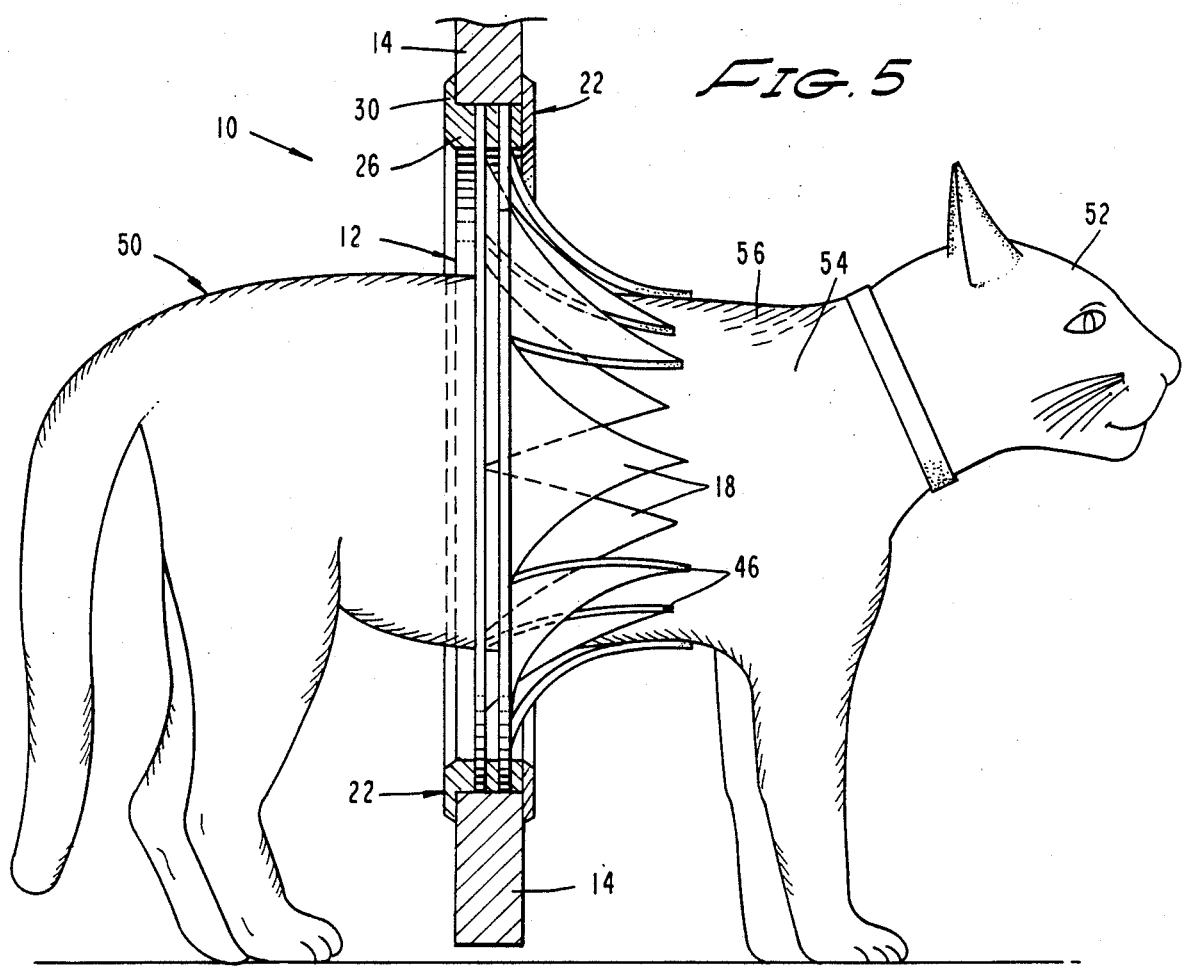
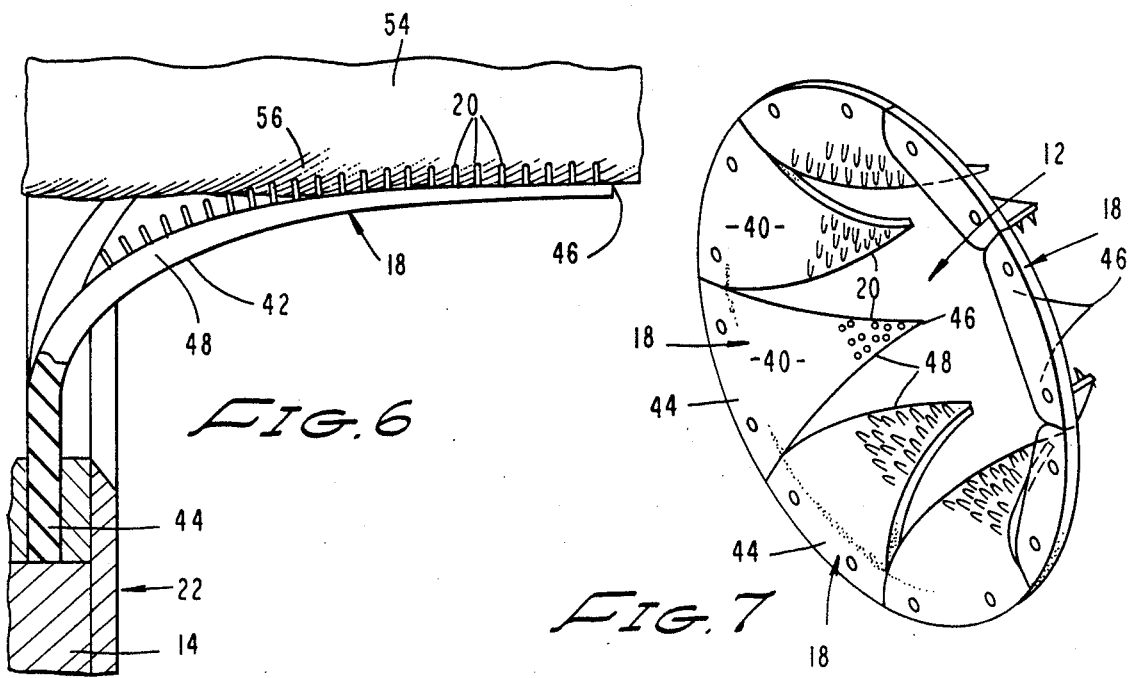

GROOMING APPARATUS AND METHOD

FIELD OF THE INVENTION

This invention relates generally to the field of pet supplies and more specifically to animal gates and animal grooming aids.

1. Background

Pet animals such as cats and dogs are generally healthier, cleaner and more aesthetically pleasing when their fur is regularly brushed or combed in the natural direction of the fur (front to back). Brushing and combing tends to remove dust, insects and other foreign matter from the animal's fur. It also stimulates the fur and the underlying skin and smooths the fur.

Since almost the beginning of time, pet owners have found it necessary to brush their pets by hand. To the applicant's knowledge, no device has ever been developed which would induce and allow a pet to perform routine brushing upon itself. Stationary brushes and scratching bristle assemblies are known in the prior art, but these devices tend only to be used by the pet for scratching an itch. The devices otherwise provide no incentive to the pet for routine brushing or combing of the fur in the natural, front-to-back direction of the fur.

Therefore, there has existed for a long time a need for a device which would provide self-grooming of a pet, i.e., a device which would provide a pet with the incentive and the ability to routinely brush or comb itself.

2. Summary

The self-grooming animal gate and method of the invention satisfies this need. For the first time a method and a device have been developed which provide daily routine combing of a pet without the pet owner having to brush or comb the pet by hand.

The invention is an animal gate for providing ingress and egress across an access opening in a vertical barrier such as a wall or door. The animal gate comprises: (i) at least one planar covering panel disposed across the access opening, the panel including at least three flexible triangular flaps, each of the flaps having a first planar surface, a second planar surface, a base edge, an oppositely-disposed apex and two side edges, and the flaps being disposed proximate to one another within the same plane with their base edges attached to the frame and their apexes convergent to about the center of the access opening; and (ii) a plurality of grooming bristles attached normal to at least one planar surface of each flap.

The flaps can be attached to the vertical barrier or they can be attached to a frame having an exterior periphery equivalent in size and shape to the access opening, the frame being attached snugly within the access opening.

The animal gate is installed in the vertical barrier to provide the pet with access to and from locations where it naturally wishes to go. To traverse the access opening across which is disposed the animal gate of the invention, the pet must push aside the flexible flaps and step through the opening. As the animal does so, the bristles tend to engage the animal's fur and comb the animal's fur in the natural direction of the fur (from front to back).

In one embodiment, two planar covering panels are attached in parallel within a frame, separated by a small distance. Both panels have a plurality of grooming bristles attached normal to one side of the planar surface of each panel and disposed in the same direction. This embodiment with a dual covering panel assembly, provides a substantial degree of grooming as the pet traverses the entrance opening.

The invention is also a method for grooming a pet comprising the step of inducing a pet to traverse the animal gate described above.

DRAWINGS

These and other features, aspects and advantages of the present invention will become better understood with reference to the following description, appended claims and accompanying drawings where:

FIG. 5 is a cross-sectional view of the animal gate shown in FIG. 1 demonstrating the animal gate in operation;

FIG. 6 is a cross-sectional side view of flaps useful in the invention and demonstrating how the bristles engage and groom the fur of an animal traversing an animal gate such as the one shown in FIG. 1;

FIG. 7 is a prospective view of flippers useful in the invention as they are deformed away from the entrance opening during operation;

DESCRIPTION

Figure 1:
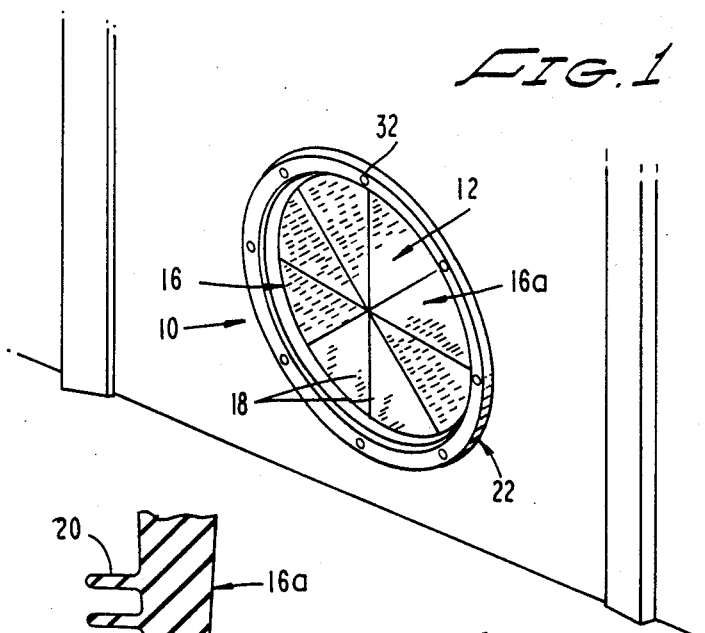
FIG. 1 is a perspective view of an animal gate having features of the invention, the animal gate being shown installed within a wall or door.
Figure 4:
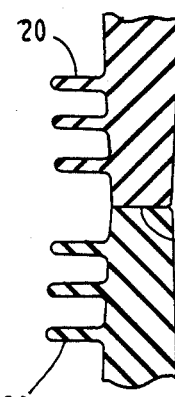
FIG. 4 is a detailed cross-sectional side view of the apexes of flaps useful in the animal gate shown in FIG. 1, the cross-section being a blow-up of the portion of FIG. 3 designated as "4".

The invention is an animal gate and a method for inducing the self-grooming of animals.

The animal gate 10 is used to provide ingress and egress across an access opening 12 in a vertical barrier 14 such as a wall or door. The animal gate 10 comprises at least one planar covering panel 16 comprised of flexible triangular flaps 18 disposed across the access opening 12 and a plurality of bristles 20 attached normal to at least one planar surface of each of the flaps 18.

Optionally, the covering panel 16 can be attached within a suitable frame 22 disposed snugly within the access opening 12. The frame 22 can be of any suitable construction and can be made of any suitable material such as woods, metals, plastics etc. The frame 22 has means 23 for attachment to the vertical barrier 14 within the access opening 12. The frame also has means 24 for attaching the planar covering panel 16 within the frame 22 so as to provide a closure across the access opening 12.

As shown in FIGS. 1–3 and 5, the frame 22 can be comprised of an inner, peripheral piece 26 having at least one slot 28 capable of accepting and retaining an edge of the covering panel 16, and molding flanges 30 adapted to abut in parallel the inside and outside vertical surfaces of the vertical barrier 14. The frame 22 can be attached to the vertical barrier 14 by frame attachment screws 32. The covering panel 16 is attached within the covering panel groove 28 by covering panel attachment screws 34.

The frame 22 is shaped to conform to the access opening 12. The access opening 12 can be of any suitable shape, preferably circular or elliptical for ease of construction and for providing maximum bristle contact with the pet.

Preferably, for minimizing costs and for maximizing bristle contact with the pet, the size of the access opening 12 is the minimum through which the animal can comfortably and willingly traverse. Where the access opening 12 and frame 22 are circular, diameters between about 6 inches and about 36 inches can be used. Diameters between about 8 inches and about 24 inches can accommodate the majority of pets.

Where the access opening 12 is elliptical, it is preferable that the vertical axis of the access opening 12 be larger than the horizontal axis of the access opening 12 because the body of a pet tends to be taller than it is wide. Vertical axes between about 6 inches and about 60 inches can be used. Vertical axes between about 6 inches and about 36 inches will accommodate most pets. Horizontal axes between about 4 inches and about 36 inches can be used. Horizontal axes between about 6 inches and about 30 inches will accommodate most pets. The ratio of the length of the vertical axis to the length of the horizontal axis can vary between about 1.0 and about 3.0. A preferred access opening and frame for small pets can have the formula $5.33X^2 + 3Y^2 = 432$, where X is the horizontal distance in inches and Y is the vertical distance in inches.

Figure 8:
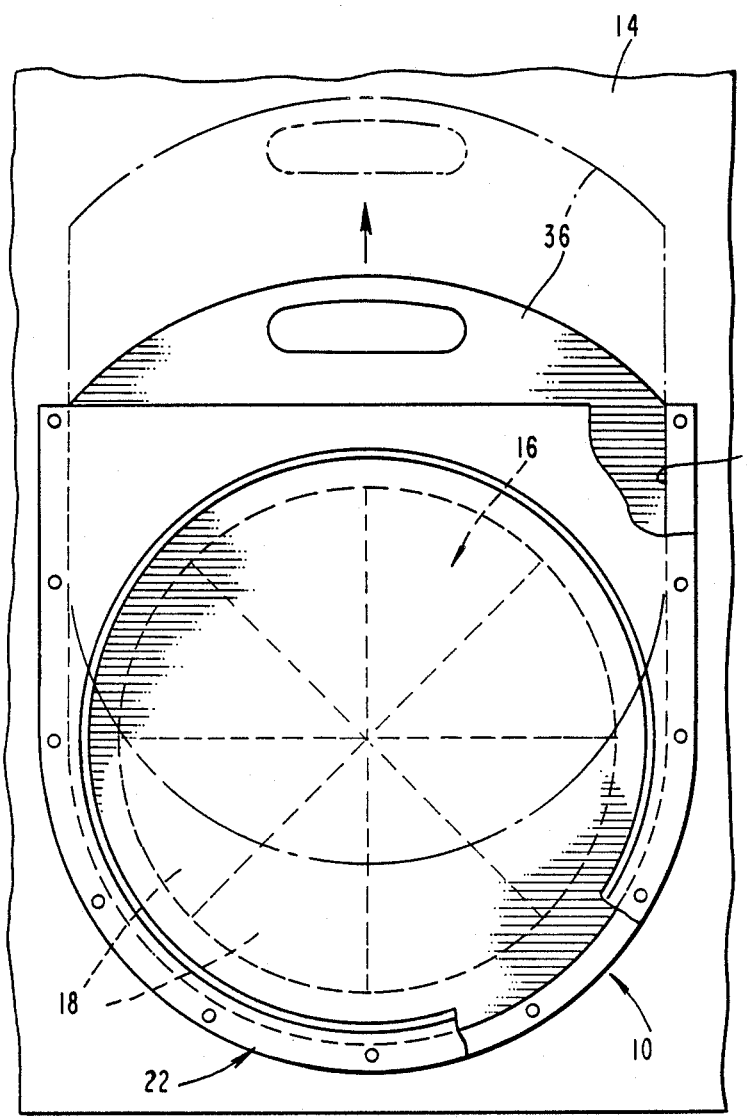
FIG. 8 is a front view of a second animal gate having features of the invention, including an optional rigid sliding closure panel.
Figure 9:
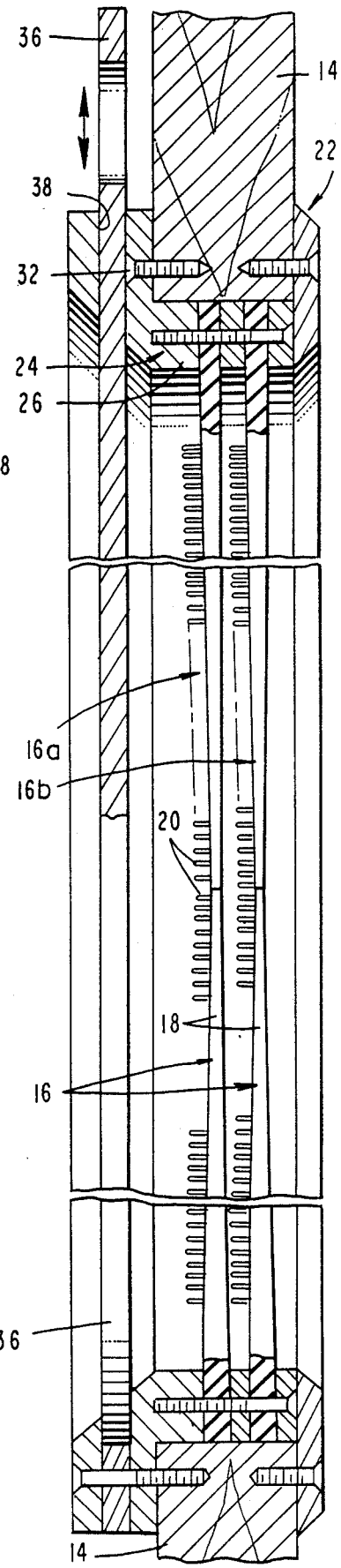
FIG. 9 is a cross-sectional side view of the animal gate shown in FIG. 8.

As shown in FIGS. 8 and 9, the frame 22 can optionally comprise a rigid sliding closure panel 36 disposed parallel with the plane of the access opening 12 within a radial panel groove 38 in the frame 22. The closure panel 36 is adapted to alternatively slide between a closed position, wherein the closure panel 36 totally blocks the access opening 12, and an open position, where the closure panel 36 covers little or none of the access opening 12. The sliding closure panel 36 can be used to rigidly block the access opening 12 when the animal gate 10 is not in use.

The planar covering panel 16 is comprised of at least three flexible triangular flaps 18, each flap 18 having a first planar surface 40, a second planar surface 42, a base edge 44, an oppositely-disposed apex 46 and two side edges 48. The flaps 18 are disposed proximate to one another within the same plane and have their base edges 44 attached to the vertical barrier 14 at the edge of the access opening 12 or to the frame 22, and their apexes 46 convergent to about the center of the access opening 12. The term "triangular" as used herein is not limited to the usual meaning of "triangular" as a polygon having three straight sides. As used herein, the term "triangular" is meant to include any polygon having two approximately straight side edges which are convergent to an apex. Wherein the access opening 12 is circular or elliptical in shape, the flaps 18 will most conveniently be "pie wedge-shaped."

The flaps 18 are constructed with sufficient rigidity that, when not in use, they retain a planar shape. The flaps 18 are, however, flexible enough so that an animal wishing to traverse the access opening 12 can comfortably push the flaps 18 aside with its head.

The flaps 18 may be constructed of any of a variety of suitable materials such as plastics and rubber. The thickness of the flaps 18 is not critical so long as the flaps 18 have sufficient rigidity to return to their planar shape (when not in use), and sufficient flexibility to allow the animal to comfortably traverse the access opening 12.

The flaps 18 are preferably tapered in thickness, having a greater cross-sectional thickness at their base edges 44 than at their apices 46. The tapering gives the flaps 18 greater flexibility at the center to facilitate the animal's initial pushing aside of the flaps 18, and greater rigidity at the base edges 44 to urge the flaps 18 against the sides of the animal as it passes through the access opening 12. The ratio of the cross-sectional thickness of the flaps 18 at their base edges 44 to the cross-sectional thickness of the flaps 18 at their apices 46 can range between about 1.0 to about 3.0.

The flaps 18 are preferably disposed within the access opening 12 so as to provide a substantially continuous closure for access 12. The flaps 18 may be disposed in a single, smooth plane with their side edges 48 proximate to one another. The flaps 18 may also be disposed within the access opening 12 so that each of the side edges 48 overlaps an adjoining side edge 48.

Figure 3:
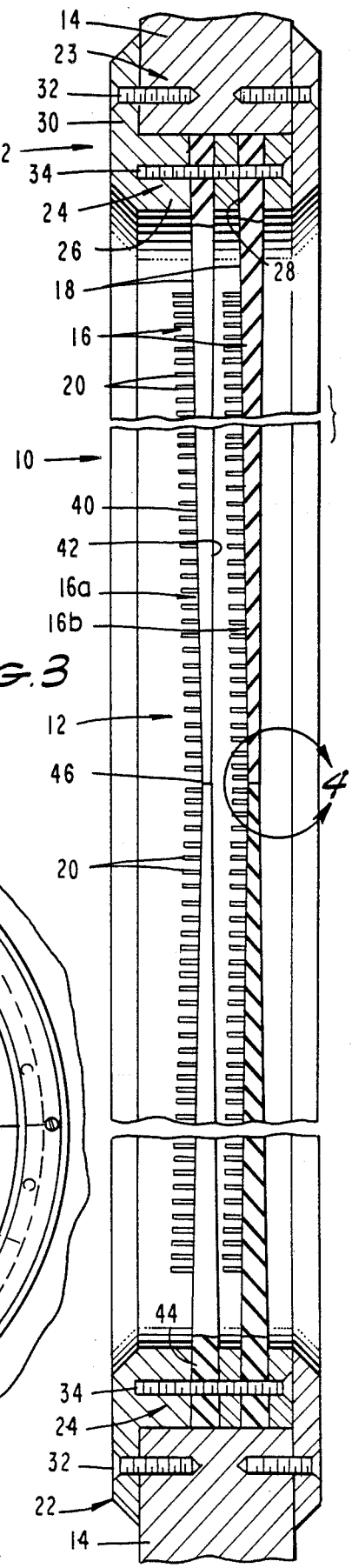
FIG. 3 is a cross-sectional side view of the animal gate shown in FIG. 1, the cross-section being taken along line 3—3 in FIG. 2.

As shown in FIG. 3, more than one planar covering panel 16 can be disposed in parallel within the frame 22. When multiple panels 16 are used, the panels 16 can abut one another or can be spaced apart by a distance of up to the depth of the access opening 12.

Figure 2:
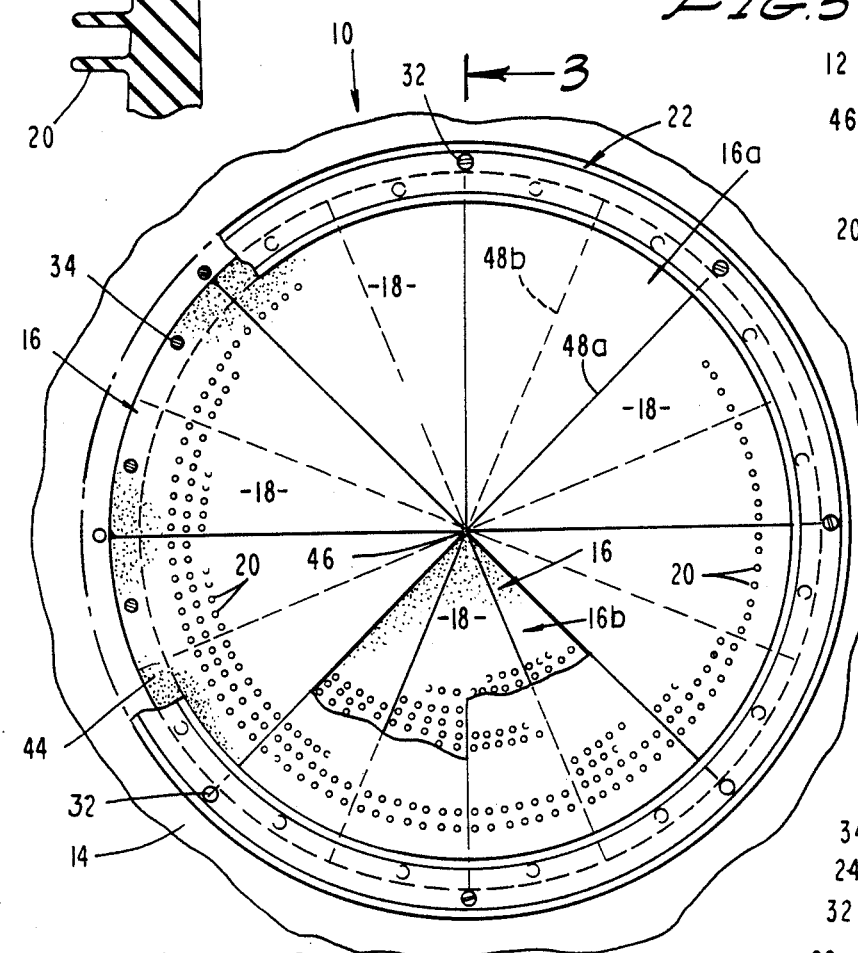
FIG. 2 is a front view of the animal gate shown in FIG. 1.

As shown in FIGS. 2 and 3, two covering panels 16, a first covering panel 16a and a second, parallel covering panel 16b are employed. The side edges 48a of the flaps 18 comprising the first covering panel 16a are not aligned with the side edges 48b of the flaps of the second covering panel, i.e., the side edges 48a of the flaps 18 of the first planar covering panel 16a are not aligned with a plane (not shown) running through the side edges 48b of the second planar panel 16b and being disposed normal to both panels 16. This non-alignment provides more complete closure of the access opening 12.

Other suitable frame and flap configurations disclosed in U.S. Pat. Nos. 2,832,406 and 4,350,198, the disclosures of which patents are incorporated by reference herein as if fully set forth, may be used in the invention.

A plurality of bristles 20 are attached normal to the flaps 18 of the covering panel 16. The number of bristles 20 per flap 18 can be greater than 10 or greater than 50, but flaps 18 having more than 100 bristles 20 per flap 18 are preferred to impart increased grooming to an animal using the animal gate of the invention 10.

The bristles 20 may be disposed on only one side of the flaps 18 or on both sides of the flaps 18. In the embodiment shown in FIG. 3, two covering panels 16 are employed, each panel 16 comprising flaps 18 having bristles disposed in the same direction.

The bristles 20 can be any size, shape and material suitable for engaging the fur of an animal using the animal gate and combing the fur of that animal. Bristles 20 having a thickness between about 1/64 of an inch and about ¼ inch may be used. Preferably, for maximum grooming efficiency, the bristles 20 are between 1/16 inch and 3/16 inch in thickness.

Bristles 20 can be between about ½ inch and about 1 inch long. Preferably, for best grooming results, the length of the bristles 20 is between about ¼ inch and about ½ inch.

The bristles 20 can be spaced apart from one another by a distance between about 1/64 inch and about 1 inch.

Preferably, for best grooming results, the bristles 20 are spaced apart from one another between about 1/16 inch and about ⅛ inch.

The bristles 20 may be made out of any suitable material, such as nylon, other plastics, "natural bristle" materials, metals and rubber. Also, the bristles 20 can be attached to the flaps 18 by any suitable method. Preferably, to minimize construction costs, the bristles 20 are molded as an integral part of the flaps 18.

As illustrated in FIGS. 5-7, in operation, an animal 50 wishing to traverse the access opening 12 pushes the flaps 18 aside with its head 52 and steps through the access opening 12. The flaps 18 are sufficiently resilient so that they are urged against the side 54 of the animal 50 as the animal 50 pushes past them. In so doing, the bristles 20 on the flaps 18 engage the fur 56 of the animal and comb the fur 56 of the animal 50 from front to back as the animal 50 passes through the access opening 12. In this way, the fur 56 of the pet animal 50 is groomed every time the animal 50 traverses the animal gate 10.

EXAMPLE

An example of an animal gate 10 encompassing features of the invention has a circular oak frame 22 with a diameter of about 30 inches.

The animal gate 10 employs two parallel covering panels 16 disposed a distance of about ⅛ inch apart. Each covering panel 16 is composed of 8 triangular flaps 18. Each flap 18 has a tapered cross-section with a base edge 44 thickness of about ⅜ inches and an apex 46 cross-section of about ¼ inch.

This example animal gate 10 has bristles 20 disposed across substantially the entire area of one side of each covering panel 16. The bristles 20 are of uniform dimension, each being about ⅜ inch high, and ¼ inch thick. The bristles 20 are molded as an integral part of each flap 18 and are disposed normal to the plane of the flap 18. Each bristle 20 is separated from an adjoining bristle 20 by a distance of about 1/16 inch.

Although the present invention has been described in considerable detail with reference to certain preferred versions, other versions are possible. Therefore, the spirit and scope of the appended claims should not necessarily be limited to the description of the preferred versions contained herein.

I claim:

1. An animal gate for providing ingress and egress across an access opening in a vertical barrier comprising:
   (a) at least one planar covering panel disposed across the access opening so as to provide a closure of the access opening; the panel comprising at least three flexible triangular flaps, each flap having a first planar surface, a second planar surface, a base edge, an oppositely-disposed apex and two side edges; the flaps being disposed proximate to one another within the same plane with their apices convergent to about the center of the access opening; and
   (b) a plurality of bristles attached normal to at least one planar surface of each flap; so that an animal can traverse the access opening by pushing aside the flaps, and so that, when an animal traverses the access opening, the bristles engage and comb the animal's fur.

2. The animal gate of claim 1 having more than one planar covering panel disposed in parallel to one another.

3. The animal gate of claim 1 having a first planar covering panel and a second planar covering panel disposed in parallel to one another.

4. The animal gate of claim 1 wherein a plurality of bristles are attached normal to both planar surfaces of each flap.

5. The animal gate of claim 1 wherein the side edges of the flaps overlap.

6. The animal gate of claim 3 wherein the side edges of the flaps of the first planar covering panel are not aligned with planes which run through the edges of the second planar panel and which are disposed normal to both panels.

7. The animal gate of claim 1 wherein the number of bristles is greater than about 100.

8. The animal gate of claim 1 wherein the bristles are between about ⅛ inch and about ½ inch in length.

9. The animal gate of claim 1 wherein the bristles are between about 1/16 inch and about 3/16 inch in thickness.

10. The animal gate of claim 1 wherein the bristles are spaced apart from one another by a distance between about 1/16 inch and about ⅛ inch.

11. The animal gate of claim 1 wherein the flaps are composed of a material selected from the group consisting of soft rubber or plastic material.

12. The animal gate of claim 1 wherein the bristles are an integral part of the flaps.

13. The animal gate of claim 1 wherein the flaps of the covering panel are attached at their base edges to a frame which has an equivalent size and shape to that of the access opening and the frame is disposed within the access opening.

14. The animal gate of claim 13 wherein the frame is circular.

15. The animal gate of claim 13 wherein the frame is oval.

16. The animal gate of claim 15 wherein the vertical axis of the frame is between about 6 inches and about 36 inches.

17. The animal gate of claim 15 wherein the horizontal axis is between about 6 inches and about 30 inches.

18. The animal gate of claim 13 further comprising a rigid panel slidably attached within the frame parallel with the planar covering panel so as to be capable of alternatively sliding across the access opening so as to cover the access opening and sliding away from the access opening so as to expose the access opening.

19. An animal gate for providing ingress an egress across an opening in a vertical barrier comprising:
   (a) a frame defining a access opening;
   (b) a first planar covering panel and a second planar covering panel disposed in parallel across the access opening; each panel having a first planar surface, a second planar surface, a base edge, an oppositely-disposed apex and two side edges; the flaps of each covering panel being disposed proximate to one another within the same plane and having their base edges attached to the frame and their apices convergent to about the center of the access opening; the side edges of the flaps of the first covering panel being not aligned with planes running through the side edges of the second covering panel and disposed normal to both covering panels; and
   (c) at least 50 bristles attached normal to the first planar surface of each of the flaps, the bristles being between about ⅛ inch and about 1 inch in length and being between about 1/16 inch and about 3/16 inch in thickness; so that an animal can traverse the access opening by pushing aside the flaps, and so that when an animal traverses the access opening, the bristles engage and comb the animal's fur.

20. A method for grooming a pet comprising the inducing of a pet to traverse an animal gate disposed across an access opening in a vertical barrier, the animal gate comprising:

(a) at least one planar covering panel disposed across the access opening so as to provide a closure of the access opening; the panel comprising at least three flexible triangular flaps, each flap having a first planar surface, a second planar surface, a base edge, an oppositely-disposed apex and two side edges; the flaps being disposed proximate to one another within the same plane with their apices convergent to about the center of the axis opening; and (b) a plurality of bristles attached normal to at least one planar surface of each flap; so that, when the pet is induced to traverse the axis opening by pushing aside the flaps, the bristles engage and comb the animal's fur.

* * * * *